United States Patent [19]

Campbell

[11] Patent Number: 5,334,727
[45] Date of Patent: Aug. 2, 1994

[54] PYRAZOLE-CONTAINING PIGMENT DERIVATIVES

[75] Inventor: Colin D. Campbell, Wilmington, Del.

[73] Assignee: Ciba-Geigy Corporation, Ardsley, N.Y.

[21] Appl. No.: 4,201

[22] Filed: Jan. 11, 1993

Related U.S. Application Data

[63] Continuation of Ser. No. 611,208, Nov. 8, 1990, abandoned.

[51] Int. Cl.$^5$ .................. C07D 231/54; C07D 498/00; C07D 471/00
[52] U.S. Cl. ................. 548/373.1; 548/364.4; 548/376.1; 548/365.7; 548/361.1; 548/377.1; 548/362.5; 548/364.7; 544/74; 544/341; 546/49; 546/56; 540/177
[58] Field of Search ............... 548/362.5, 364.7, 364.4, 548/376.1, 365.7, 361.1, 373.1, 377.1; 546/49, 56; 540/127; 544/341, 74

[56] References Cited

U.S. PATENT DOCUMENTS

| | | |
|---|---|---|
| 2,761,868 | 9/1956 | Lacey et al. ........................ 546/49 |
| 3,275,637 | 9/1966 | West ................................. 260/279 |
| 3,362,957 | 1/1968 | West ................................. 260/79 |
| 3,386,843 | 6/1968 | Jaffe et al. ......................... 546/49 |
| 3,647,819 | 3/1972 | Kirchner et al. ................. 548/364.7 |
| 3,752,817 | 8/1973 | Ehrich et al. ..................... 260/279 |
| 3,925,304 | 12/1975 | Minieri ............................. 548/362.5 |
| 4,017,479 | 4/1977 | Kaupp et al. ..................... 548/362.5 |
| 4,018,791 | 4/1977 | Spietschka et al. ............... 540/127 |
| 4,029,670 | 6/1977 | Pond et al. ....................... 548/362.5 |
| 4,171,446 | 10/1989 | Wiedemann et al. ............. 548/364.7 |
| 4,310,359 | 1/1982 | Ehashi et al. ..................... 540/127 |
| 4,400,515 | 8/1983 | Fuchs et al. ...................... 546/57 |
| 4,451,398 | 5/1984 | Patsch et al. ..................... 546/49 |
| 4,837,235 | 6/1989 | Bernstein et al. ................. 548/371.1 |
| 4,986,852 | 1/1991 | Dietz et al. ....................... 106/498 |

FOREIGN PATENT DOCUMENTS

| | | | |
|---|---|---|---|
| 0321919 | 6/1989 | European Pat. Off. | ............ 260/279 |
| 0362690 | 4/1990 | European Pat. Off. | ............ 260/154 |
| 2742034 | 9/1979 | Fed. Rep. of Germany | ...... 260/152 |
| 2162353 | 12/1988 | Japan . | |

OTHER PUBLICATIONS

Andriani et al., "Reactivity of Mannich Bases", *Jour. Chem. Res. Soc. C*, (9), 1157–61, 1970.
Chem. Abst. 103: 179660K (1985).
Chem. Abst. 94: 176684 (1981).

*Primary Examiner*—José G. Dees
*Assistant Examiner*—Keith MacMillan
*Attorney, Agent, or Firm*—George R. Dohmann

[57] ABSTRACT

Pyrazole derivatives of a variety of polycyclic pigments, particularly quinacridone pigments, corresponding to the general formula

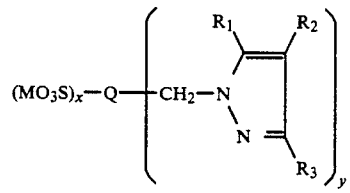

wherein Q is the primary pigment structure; and the use of such derivatives as additives to pigment systems to provide a broad range of performance benefits to the resulting pigment compositions

26 Claims, No Drawings

PYRAZOLE-CONTAINING PIGMENT DERIVATIVES

This application is continuation, of application Ser. No. 07/611,208, filed Nov. 8, 1990 now abandon.

This invention relates to novel pigment derivatives or pigment additives containing pyrazole groups, a process for their preparation and their use as additives in pigmented systems to provide improved characteristics thereto.

The modification of pigments by treating their surface with their own derivatives, forming blended pigment compositions, and the like, is known in the art. Such additives serve to control and/or improve a variety of properties of the ink, paint or plastic medium into which the pigment has been incorporated. Beneficial effects have been noted in such properties as color strength, hue, gloss, distinctness of image, transparency, theology, deflocculation, and the like.

Examples of such additives as directed to quinacridone pigments include quinacridone sulfonic acids (U.S. Pat. No. 3,362,957, U.S. Pat. No. 3,386,843), quinacridone sulfonamides (EP 148022), quinacridone carboxylic acids (U.S. Pat. No. 3,752,817) and quinacridone carboxamides (U.S. Pat. No. 4,310,359, U.S. Pat. No. 4,400,515). These derivatives are generally synthesized from sulfonated or chlorosulfonated quinacridones or from appropriate substitution of reagents during synthesis. Functional groups attached to the quinacridone nucleus via a methylene group (—$CH_2$—) can be obtained by chloromethylation (JP 80-125160), a process now considered unacceptable due to the formation of highly toxic bis(chloromethyl) ether, or by amidomethylation. An example of the latter is phthalimidomethylation (U.S. Pat. No. 3,275,637) in which the bond to the methylene group is formed via the nitrogen atom of the heterocycle. Heterocycles can also be linked to quinacridone through a methylene group via a carbon atom of the heterocyclic ring (U.S. Pat. No. 4,451,398) using a similar process. Quinacridone derivatives in which the pigment is linked to nitrogen via, inter alia, a methylene or sulfonyl group are likewise described in EP 362690 and JP 63-264674.

Correspondingly, phthalimidomethylation of copper phthalocyanine is described in U.S. Pat. No. 2,761,868, while phthalimidomethylation of indanthrone, flavanthrone, pyranthone and perylenes is further described in U.S. Pat. No. 4,256,507. Reference is also made to EP 321,919 which broadly discloses a series of pigment derivatives with heterocyclic substituents wherein the linkage of the heterocyclic group to the pigment is by means of a methylene group to a carbon atom in the heterocyclic ring. Imidazole derivatives are particularly featured in this publication.

Frequently, the performance of such treated pigments is system dependent, that is performance is affected by the type of vehicle (resin) and/or solvents utilized therein. Additionally, more stringent requirements are frequently applied to modern high solids, low solvent systems where appropriate viscosity values must be attained and where pigment and system compatibility must be of a particularly high order to obtain finishes with high gloss and distinctness of image.

Pyrazole derivatives which substantially meet the above noted requirements have now been identified. Thus, it has been determined that the pyrazole group can be attached by a nitrogen atom of the pyrazole ring to the pigment nucleus via a methylene group by a direct and economical method to yield pyrazole derivatives as surface treating agents which unexpectedly impart excellent rheological and tinctorial properties when incorporated into finished or semifinished pigment compositions, particularly quinacridone, substituted quinacridones or quinacridone solid solutions. Such pigments are of great value in the paint (especially automotive topcoat, automotive refinish and general industrial paints) industry and in the plastics, fibers and inks industries.

The pyrazole derivatives of the invention correspond to the formula

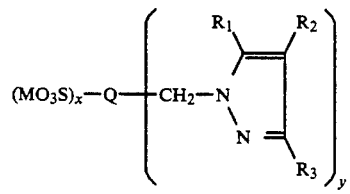

wherein

Q is a pigment structural moiety;

$R_1$, $R_2$ and $R_3$ are independently hydrogen; halogen; $C_1$–$C_{18}$alkyl, optionally substituted with one or more halogen or $C_1$–$C_6$alkoxy groups; $C_6$–$C_{12}$aryl, optionally substituted with $C_1$–$C_{18}$alkyl, halogen, nitro, or $C_1$–$C_6$alkoxy groups; or $R_1$ and $R_2$ together with the carbons o the pyrazole ring form part of an alicyclic, aromatic or heterocyclic ring;

M is hydrogen, a quaternary nitrogen cation or a metal cation;

x is 0 to 2; and y is 0.05 to 4.

The pigment moiety of the pyrazole derivatives of this invention include unsubstituted quinacridone, substituted quinacridones such as 2,9-dichloroquinacridone, 2,9-dimethylquinacridone and 4,11-dichloroquinacridone, 1,4-diketo-pyrrolopyrroles, phthalocyanines, indanthrones, isoindolinones, isoindolines, flavanthrones, pyranthrones, anthraquinones, thioindigos, perylenes and dioxazine and solid solutions containing two or more of these pigment moieties. Unsubstituted quinacridone, 1,4-diketopyrrolopyrroles, substituted quinacridones, copper phthalocyanine and perylene tetracarboxylic di-imide and their solid solutions are preferred, with quinacridone, substituted quinacridones and quinacridone solid solutions being particularly preferred.

Typical R groups include hydrogen, chlorine, methyl, ethyl, 2-chloroethyl, 2-methoxyethyl, benzyl, phenyl, naphthyl, p-chlorophenyl and p-methoxyphenyl. Particularly preferred substituent patterns include $C_1$–$C_6$alkyl groups, and preferably methyl, in the 3- and 5-positions (i.e. $R_1$ and $R_3$) of the pyrazole ring.

Examples of M as a quaternary nitrogen cation are ammonium, trimethylcetylammonium and tributylbenzylammonium; and as a metal cation include sodium. potassium, magnesium, calcium, strontium, barium, aluminum and zinc.

Preferred x and y values are x=0 to 0.2 and y=0.1 to 1.0.

The pyrazole-derivatized pigments of the present invention are prepared by (a) the reaction of N-hydroxymethyl derivatives of the appropriate pyrazole with the desired pigment moiety in a dehydrating solvent, (b)

the reaction of the appropriate pyrazole, formaldehyde (in the form of its polymer, paraformaldehyde) and a pigment moiety in a dehydrating solvent or (c) sulfonation of a pigment moiety in concentrated or fuming sulfuric acid following by reaction with an N-hydroxymethyl pyrazole (or paraformaldehyde and a pyrazole) in the same solvent. The dehydrating solvent may be, for example, concentrated sulfuric acid, polyphosphoric acid, organic acids and their anhydrides or mixtures of these. Oleum is particularly preferred for less reactive pigment moieties such as copper phthalocyanine. The pyrazole reactants are either commercially available or can be prepared by methods well known in the art. Conversion to N-hydroxymethylpyrazoles occurs by reaction of a pyrazole with aqueous formaldehyde or by fusion with paraformaldehyde.

Conditions of the reactions vary depending on the degree of sulfonation or pyrazol-1-ylmethylation desired, although reaction temperatures usually range from 50°–110° C. and reaction times usually range from 1–10 hours in 96% sulfuric acid. An increase in the proportion of sulfonation versus pyrazol-1-ylmethylation is achieved by utilizing higher temperatures, longer reaction times and increased strengths of sulfuric acid. An increase in the proportion of pyrazoyl-1-ylmethylation versus sulfonation is achieved by utilizing lower temperatures (50°–60° C.) and lower sulfuric acid concentrations, or by use of a non-sulfonating medium such as polyphosphoric acid. Isolation of the products is generally achieved by drowning out of the acid solution into water (which may contain organic solvents or surfactants or both), filtration and washing acid-free. Salt formation of the sulfonic acid group may be achieved at this point by heating an aqueous slurry of the product with an ammonium or metal salt, such as calcium chloride, ammonium hydroxide or hydrated aluminum sulfate.

A further aspect of the instant invention is directed to pigment compositions comprising a primary pigment and from about 0.1–20% of the pyrazole derivative, based on primary pigment weight. Preferred concentrations range from 1.0 to 10.0%, by weight of primary pigment. Although the use of the identical pigment moiety in the primary pigment and in the derivative is preferred, the use of diverse pigment moieties is likewise available where the respective pigments are color compatible (e.g. quinacridone derivative in 1,4-diketopyrrolopyrrole primary pigment).

Examples of applicable organic primary pigments are: anthraquinone, phthalocyanine, perinone, perylene, dioxazine, diketopyrrolopyrrole, thioindigo, isoindoline, isoindolinone, quinacridone, quinacridonequinone, flavanthrone, indanthrone, anthrapyrimidine or quinophthalone pigments, and solid solutions comprising these pigments. Pigments having good heat resistance and high transparency are especially suitable. Preferred organic pigments are quinacridones, phthalocyanines, anthraquinones, perylenes, diketopyrrolopyrroles, isoindolinones and indanthrones.

Incorporation of the derivative into the primary pigment can be accomplished by blending aqueous or non-aqueous slurries or presscakes, by co-milling the dry powders in the presence or absence of inert grinding aids, by co-dissolution in a common solvent (for example, 96% sulfuric acid) and drowning out, by addition of a solution of the additive to a slurry of the pigment, by additional mechanical procedures, or by any other method well-known in the art.

The compositions of the invention may additionally contain 0.05–20% and preferably 1–10%, by weight, sulfonated derivatives of polycyclic pigments. Beneficial effects over and above those observed for the individual pyrazole or sulfonated derivatives are frequently achieved and thought to manifest themselves by virtue of an ionic pair formation between substituent acid (sulfonic) and substituent base (pyrazole).

The compositions of the invention may contain additional optional ingredients in order to further improve texture of the pigment composition. Suitable texture improving agents are, for example, fatty acids having at least 12 carbon atoms, such as stearic acid or behenic acid; amides, esters or salts thereof, such as magnesium stearate, zinc stearate, aluminum stearate or magnesium behenate; quaternary ammonium compounds, such as tri-($C_1$–$C_4$)-alkylbenzyl-ammonium salts; ammonium salts; plasticizers, such as epoxidized soya bean oil; waxes, such as polyethylene wax; resin acids, such as abietic acids, rosin soap, hydrogenated or dimerized rosin; $C_{12}$–$C_{18}$-paraffin-disulfonic acids; alkylphenols; alcohols, such as stearyl alcohol; laurylamine or stearylamine; and aliphatic 1,2-diols, such as dodecane-1,2-diol. Preferred texture improving agents are laurylamine, stearylamine, aliphatic 1,2-diols, stearic acid, amides, salts or esters thereof, epoxidized soya bean oil, waxes or resin acids. These additives can be incorporated in amounts of 0.05 to 20 percent by weight, based on pigment, and preferably 1 to 10%.

As previously noted, the pigment compositions are useful in a wide variety of industrial paints and coatings, such as automotive finishing and refinishing paints based on alkyd/melamine, acrylic/melamine, acrylic-/urethane, thermosetting or thermoplastic acrylic resins, in both conventional and high solid forms, as well as in aqueous based coating systems. The presence of the pigment derivative or derivatives leads to surprisingly improved rheological characteristics of the pigment dispersions, thus affording increased fluidity relative to the use of a pigment alone. As a desirable result thereof, it is possible to increase the pigment concentration and-/or decrease the solvent content, thereby reducing the volatile organic component of the paint. In addition, improvements are particularly noted in gloss and distinctness of image or mirror quality improvement of the automotive or other similar finishes, particularly in one-coat systems.

The following examples further illustrate the preferred embodiments of this invention. In these examples, all parts given are by weight unless otherwise noted.

EXAMPLE 1

Crude quinacridone (31.2 g, 0.1 mole) is charged into a reaction vessel and is dissolved in 96% sulfuric acid (250 g). Stirring continues at 40° C. whereupon 1-hydroxymethyl-3,5-dimethylpyrazole (12.6 g, 0.1 mole) is added over 10 minutes. The reaction mixture, which exhibits an exotherm to 60° C., is stirred at 60° C. for five hours. The fluid reaction mass is then poured into a vigorously stirred mixture of ice and water (1500 ml) and after one hour, filtered, washed to neutral filtrate pH with water and dried (or stored as presscake).

Elemental analysis indicates that the product contains 0.5 3,5-dimethylpyrazole-1-methyl groups and 0.05 sulfonic acid groups.

EXAMPLE 2

Crude quinacridone (31.2 g, 0.1 mole) is dissolved in 96% sulfuric acid (200 g) and stirred at 40° C. 3,5-Dimethylpyrazole (9.6 g, 0.1 mole) is added slowly (mild exotherm) followed by the addition of paraformaldehyde (3.0 g, 0.1 mole). The temperature rises to 63° C. The mixture is stirred at 60° C. for five hours, then poured into 3 liters of ice water, stirred vigorously for one hour, filtered and washed to a filtrate of pH 5.5 with water, and dried.

Elemental analysis shows a product composition of 0.9 3,5-dimethylpyrazole- 1-methyl groups and 0.1 sulfonic acid groups.

EXAMPLE 3

To 96% sulfuric acid (312 g) at 25° C. is added crude quinacridone (31.2 g, 0.1 mole) in portions with good agitation. The mixture is heated to 99° C., maintained at 99° C. for one hour and then cooled immediately to 50° C. 1-Hydroxymethyl-3,5-dimethylpyrazole (12.6 g, 0.1 mole) is added in portions and the mixture is stirred for five hours at 60° C. It is then poured into two liters of cold water, stirred vigorously for one hour and filtered. On washing, a heavy bleed (red color of filtrate) is noticed when pH of the filtrate is greater than 1. The filtration is ended at this stage and the resulting product is used as an additive in the presscake or reslurried form.

A portion of the slurry is converted to the aluminum salt by reaction with excess aluminum sulfate followed by filtration, thorough washing and drying. Elemental analysis shows a product composition of 0.5 3,5-dimethylpyrazole-1-methyl groups and 1.0 sulfonic acid group.

EXAMPLE 4

Crude quinacridone (15.6 g, 0.05 mole) is dissolved in 96% sulfuric acid (100 g) and stirred at 40° C., whereupon 3-methylpyrazole (4.1 g, 0.05 mole) is added and the temperature rises to 54° C. Paraformaldehyde (1.5 g, 0.05 mole) is added and the mixture heated with stirring at 60° C. for 3.5 hours. The reaction mixture is poured into 1500 ml water at 30° C. with vigorous agitation, stirred 20 minutes, then filtered and washed with water to a filtrate pH of 7.0 and dried.

Elemental analysis identifies a product composition of 0.3 3-methylpyrazole-1-methyl groups and 0.1 sulfonic acid groups.

EXAMPLE 5

Example 4 is repeated except that indazole (5.9 g, 0.05 mole) is used in place of 3-methylpyrazole. The resulting product analyzes for 0.7 indazole-1-methyl groups with less than 0.05 sulfonic acid groups.

EXAMPLE 6

3,6-Diphenyl-1,4-diketopyrrolo[3,4-c]pyrrole (28.8 g, 0.1 mole) is dissolved in 96% sulfuric acid (315 g) and stirred at 35° C. to complete solution. 3,5-Dimethylpyrazole (9.6 g, 0.1 mole) is added with cooling so as to maintain the temperature below 40° C., followed by the addition of paraformaldehyde (3.0 g, 0.1 mole). The mixture is heated at 40° C. for 2 hours, poured into 1500 ml iced water, stirred for one hour and then filtered and washed to a filtrate pH of 4.0 with warm water.

The dried product analyzes for 0.7 3,5-dimethylpyrazole-1-methyl groups and 0.2 sulfuric acid groups.

EXAMPLE 7

Example 6 is repeated with the exception that the temperature is controlled at less than 25° C. throughout the reaction. The dried product analyzes for 0.5 3,5-dimethylpyrazole-1-methyl groups and no sulfonic acid groups.

EXAMPLE 8

Copper phthalocyanine (28.8 g, 0.05 mole) is dissolved in 96% sulfuric acid (100 g) at 45° C., whereupon 3,5-dimethylpyrazole (4.8 g, 0.05 mole) is added. The temperature rises to 60° C. and paraformaldehyde (1.5 g, 0.05 mole) is added. The mixture is stirred at 60° C. for 10 minutes and 20% oleum (100 g) is carefully added over 10 minutes allowing the temperature to rise to 75° C. The mixture stirred at 80° C. for four hours, poured into rapidly stirred cold water, filtered and washed with warm water to a filtrate pH of 7.0.

The product is dried and analyzed giving 0.75 3,5-dimethylpyrazole-1-methyl groups per copper phthalocyanine molecule.

EXAMPLE 9

N,N'-Dimethyl perylenetetracarboxylic bisimide (20.9 g, 0.05 mole) is dissolved in 96% sulfuric acid (125 g) at 40° C. Stirring is continued until complete solution, whereupon 3,5-dimethylpyrazole (14.4 g, 0.15 mole) is added over a 20 minute period. The exotherm reaches 67° C. and paraformaldehyde (4.5 g, 0.15 mole) is added with the temperature reaching 80° C. The reaction mixture is cooled to 70° C. and approximately 20% oleum (100 g) is slowly added. A maximum temperature of 93° C. is attained. Stirring continues at 80° C. for four hours, whereupon the reaction mixture is poured into 1500 ml cold water. The product is collected by filtration and washed with water until the pH of filtrate is 3.2 and is then dried at 80° C.

Elemental analysis shows 0.7 3,5-dimethylpyrazol-1-methyl groups and 0.2 sulfonic acid groups.

EXAMPLE 10

Indanthrone (22.1 g, 0.05 mole) is stirred into 96% sulfuric acid (221 g) at 35° C. and 3,5-dimethylpyrazole (5.0 g, 0.052 mole) is added followed by paraformaldehyde (1.6 g, 0.053 mole). With the temperature at 42° C., 30% oleum (167 g, 0.63 mole) is slowly added whereupon the temperature rises to 72° C. The mixture is heated at 100° C. for 4 hours and is then poured into rapidly stirred ice-water (1700 ml). The product is filtered, washed with water to a filtrate pH of 3.8.

Elemental analysis on the dried product shows the incorporation of 1.0 3,5-dimethylpyrazole group and 1.0 sulfonic acid group.

EXAMPLE 11

Crude γ-quinacridone (25 parts) and crude 2,9-dichloroquinacridone (75 parts) are co-milled with aluminum sulfate pentadecahydrate (390 parts) in the presence of tetrachloroethylene (14 parts), followed by extraction with aqueous sulfuric acid as described in U.S. Pat. No. 4,015,998. The presscake so obtained is slurried in water and made slightly alkaline (pH 9) with aqueous sodium hydroxide. An aqueous slurry of the product from Example 1 containing 3 parts solids is admixed and the slurry mixture heated with stirring to 70° C. for 30 minutes. The product is filtered hot, washed with warm water to neutral filtrate, dried at 80° C. for 24 hours, then pulverized and sieved.

When this pigment is incorporated into an acrylic system millbase at 8% pigmentation, after milling the millbase viscosity (Brookfield Viscometer spindle #3 at 25° C.) of the dispersion is 4420 cps at 10 rpm and 1150 cps at 50 rpm compared to corresponding figures of 7700 and 1760 for the millbase containing the same pigment without the additive.

EXAMPLE 12

A base pigment slurry is prepared as in Example 11 and an aqueous slurry of the product of Example 1 containing six parts solids is added. After working up as in Example 11, and incorporation into an acrylic system millbase at 8% pigmentation, the millbase viscosity (Brookfield Viscometer, spindle #3) is 980 cps at 10 rpm and 398 cps at 50 rpm compared to 7580 and 1710, respectively, for the dispersion containing the same pigment absent·additive.

EXAMPLE 13

The presscake from the co-milled quinacridone mixture in Example 11 is reslurried in water, pH adjusted to 1.5 with 10% sulfuric acid, and heated with steam to 90° C. Aluminum sulfate octadecahydrate (27 parts) is added with stirring followed, after 5 minutes, by the addition of quinacridone monosulfonic acid (4·parts) as a 3% aqueous slurry. The resultant mixture is maintained at 90° C. for 3 minutes, whereupon six parts of the product from Example 1 slurried in water is added and the temperature maintained at 70° C. for 30 minutes. The product is filtered hot and washed with hot water to a pH 7.0. When the product is dried, pulverized and incorporated at 8% pigmentation into a dispersion which is to be used in the basecoat of a two-coat automotive paint finish, it exhibits a Brookfield viscosity of 44 cps at 10 rpm and 41 cps at 50 rpm, compared with a control containing the sulfonic acid derivative but not the pyrazole derivative which exhibits viscosities of 780 and 346 cps.

EXAMPLE 14

Incorporation of four parts of the product from Example 3 as an aqueous slurry into the base pigment prepared in Example 11 yields a product which, after incorporation into a dispersion of the same paint system as in previous examples at 8% pigmentation, gives a millbase viscosity (Brookfield) of 1640 cps at 10 rpm and 544 at 50 rpm compared to a control with no pyrazole derivative of 7720 and 1700 cps, respectively.

EXAMPLE 15

The product of Example 14 is further treated at the aqueous slurry stage with four parts quinacridone monosulfonic acid as an aqueous acidic presscake. The previously described workup procedure yields a product which, when incorporated at 8% into a dispersion of the same paint system as in Example 14, yields a millbase Brookfield viscosity of 140 cps at 10 rpm and 144 at 50 rpm. Corresponding figures for treatment with four parts quinacridone monosulfonic acid only show viscosities of 6950 and 1620 cps, respectively.

EXAMPLE 16

Crude 2,9-dimethylquinacridone (120 parts) is dry milled with sodium sulfate (12 parts) and then aqueous milled for 72 hours in the presence of trisodium phosphate (120 parts), pentanol (20 parts), water (950 parts) and benzyltributylammonium chloride (1.5 parts). After removal of the milling media, the slurry is adjusted to a pH 2.0 with 50% aqueous sulfuric acid and heated to 90° C. for one hour. A slurry of quinacridone monosulfonic acid (4.8 parts) in water is added and the mixture heated again at 90° C. for 30 minutes. The mixture is filtered and the pigment reslurried in hot water and an aqueous slurry of five parts of the pyrazole derivative from Example 2 is added. The mixture is heated at 90° C. for 30 minutes, then filtered and washed with hot water to a filtrate pH of 7.0. The product is dried at 80° C., pulverized and incorporated into an acrylic dispersion which is to be used in a two-coat automotive paint system at 16% pigmentation. Brookfield viscosities of the millbase equal 4150 cps at 10 rpm and 1650 cps at 50 rpm compared to 8940 and 2860 cps respectively for a similar paint millbase without the pyrazole derivative.

EXAMPLE 17

A slurry of 3,6-di-p-chlorophenyl-1,4-diketopyrrolo [3,4-c] pyrrole (30 parts) in water (260 parts) is treated with a slurry of the product of Example 6 (1.2 parts) in water. After blending for 15 minutes, the product is filtered, washed with water and dried. On incorporation into an acrylic millbase at 28% pigmentation for use in automotive paints, Brookfield viscosities of 830 cps at 10 rpm and 362 cps 50 rpm are recorded compared to 2160 and 774 cps respectively for the millbase containing no pyrazole additive.

EXAMPLE 18

Co-grinding of 19 parts IRGAZIN DPP Red BO (a diketo-pyrrolopyrrole from CIBA-GEIGY Corp.) with the product of Example 7 (1 part) into an acrylic millbase at 12% pigmentation (pigment to binder ratio 0.28) affords a millbase dispersion with viscosity of 388 cps at 1 rpm and 209 cps at 10 rpm compared to 2106 cps and 381 cps, respectively, for the untreated pigment.

EXAMPLE 19

Co-grinding 19 parts IRGAZIN DPP Red BO (a diketo-pyrrolopyrrole from CIBA-GEIGY Corp.) with the product of Example 2 (1 part) into an acrylic millbase at 12% pigmentation affords a millbase dispersion with viscosity of 1408 cps at 1 rpm and 307 cps at 10 rpm compared to 2106 cps and 381 cps respectively for the untreated pigment.

EXAMPLE 20

Dissolution of N,N'-dimethylperylenetetracarboxylic acid di-imide (20 parts) in 96% sulfuric acid (120 parts) is followed by addition of one pan of the product from Example 9. Subsequent drowning into cold water with high speed stirring followed by filtration washing acid free and drying yields a product which, when incorporated into a dispersion of a high solids enamel paint system at 16% pigmentation gives viscosities of 320 cps at 10 rpm and 156 cps at 50 rpm. A control with no additive exhibits corresponding viscosities of 500 cps and 206 cps, respectively.

EXAMPLE 21

IRGAZIN Blue X-3367 (copper phthalocyanine mixture from CIBA-GEIGY Corp.) (20 parts) and the product from Example 8 (1 part) are combined as aqueous slurries using a high speed mixer. After filtration, washing and drying, the product is incorporated into a dispersion of a high solids enamel paint system at 16% pigmentation. Viscosities of the dispersion are 1810 cps at 10 rpm and 795 cps at 50 rpm compared to 2620 cps and 874 cps for the same dispersion without the additive.

EXAMPLE 22

Crude γ-quinacridone (25 parts) and crude 2,9-dichloroquinacridone (75 parts) are co-milled with aluminum sulfate pentadecahydrate (390 parts) in the presence of tetrachloroethylene (14 parts), followed by extraction with sulfuric acid containing toluene as described in U.S. Pat. No. 3,362,957. The presscake so obtained is washed to neutral pH and reslurried in water, whereupon quinacridone mono-sulfonic acid (4 parts) is added as an acidic slurry. The pH is adjusted to 3.0 with aqueous sodium hydroxide solution and the pyrazole derivative from Example 2 (4 parts) is added as an aqueous slurry. The mixture is stirred while heating to 90° C. and held at this temperature for 30 minutes. The product is isolated by filtration, washing with water to a filtrate pH >6.5 and drying at 80° C.

The pulverized, dried pigment when incorporated into a millbase of an acrylic resin system at 8% pigmentation shows a millbase viscosity (Brookfield Viscometer, spindle #3) after 64 hours ballmilling of 110 cps at 10 rpm and 74 cps at 50 rpm. A similar dispersion without the addition of the product from Example 2 shows viscosities of 2300 cps and 708 cps respectively.

EXAMPLE 23

Crude 2,9-dimethylquinacridone (100 parts) is milled with sodium sulfate (10 parts). The millpowder is then aqueous milled for 72 hours with the product of Example 2 (2 parts), trisodium phosphate dodecahydrate (100 parts), n-pentanol (17 parts), 50% aqueous benzyl-tributylammonium chloride (2.5 parts) and water (792 parts). The mill contents are diluted with water, acidified to pH 2 with sulfuric acid, heated to 90° C. for 1 hour and then admixed with an aqueous acidic slurry of quinacridone mono-sulfonic acid (4 parts). Heating is continued for 30 minutes at 90° C., whereupon the mixture is filtered and washed with water to a filtrate pH of 7.0. The pigment is dried at 80° C.

The dried, pulverized pigment is incorporated into a waterborne dispersion at 13% pigmentation, suitable for use in producing a pigmented base-coat in two-coat automotive finishes. The millbase viscosity (Brookfield) of the dispersion shows 130 cps at 10 rpm and 112 cps at 50 rpm. The dispersion made up into a paint and used as the base-coat in a base-coat/clear-coat automotive finish shows excellent distinctness of image and tint strength.

What is claimed is:

1. A pyrazole derivative corresponding to the formula

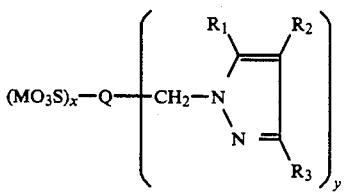

wherein
Q is a pigment moiety;
$R_1$, $R_2$ and $R_3$ are independently hydrogen; halogen; $C_1$-$C_{18}$alkyl, optionally substituted with one or more halogen or $C_1$-$C_6$alkoxy groups, $C_6$-$C_{12}$aryl, optionally substituted with $C$-$C_{18}$alkyl, halogen, nitro, or $C_1$-$C_6$alkoxy groups, or $R_1$ and $R_2$ together with the carbons of the pyrazole ring form a benzene ring;
M is hydrogen, a quaternary nitrogen cation or a metal cation;
x is 0 to 2; and
y is 0.05 to 4.

2. The derivative of claim 1, wherein Q is selected from the group consisting of unsubstituted and substituted quinacridones, 1,4-diketo-pyrrolopyrroles, phthalocyanines, indanthrones, isoindolines, isoindolinones, flavanthrones, pyranthrones, anthraquinones, thioindigos, perylenes and dioxazines and solid solutions containing at least two of these moieties.

3. The derivative of claim 2, wherein Q is selected from the group consisting of unsubstituted and substituted quinacridones, 1,4-diketopyrrolopyrroles, copper phthalocyanine and perylene tetracarboxylic di-imide moieties and solid solutions containing at least two of the moieties.

4. The derivative of claim 3, wherein Q is selected from the group consisting of unsubstituted and substituted quinacridones, 1,4-diketopyrrolopyrroles and solid solutions containing at least two of the moieties.

5. The derivative of claim 1, wherein $R_1$, $R_2$ and $R_3$ are independently hydrogen, chlorine, methyl, ethyl, 2-chloroethyl, 2-methoxyethyl, benzyl, phenyl, naphthyl, p-chlorophenyl or p-methoxyphenyl.

6. The derivative of claim 5, wherein $R_2$ is hydrogen, and $R_1$ and $R_3$ are methyl.

7. The derivative of claim 1, wherein $R_1$ and $R_2$ are a fused benzene ring.

8. The derivative of claim 1, wherein M is hydrogen, ammonium, trimethylcetylammonium or tributylbenzylammonium radicals, or sodium, potassium, magnesium, calcium, strontium, barium, aluminum or zinc metal cations.

9. The derivative of claim 8, wherein M is hydrogen.

10. The derivative of claim 1, wherein x is 0 to 0.2 and y is 0.1 to 1.0.

11. A pigment composition comprising a pigment and from 0.1-20%, by weight, of the pyrazole derivative of claim 1.

12. The composition of claim 11, wherein said pigment is an organic pigment.

13. The composition of claim 12, wherein said pigment and the Q substituent of the pyrazole derivative are the same pigment moiety.

14. The composition of claim 12, wherein Q is selected from the group consisting of unsubstituted and substituted quinacridones, 1,4-diketo-pyrrolopyrroles, phthalocyanines, indanthrones, isoindolines, isoindolinones, flavanthrones, pyranthrones, anthraquinones, thioindigos, perylenes and dioxazines and solid solutions containing at least two of these moieties.

15. The composition of claim 14, wherein Q is selected from the group consisting of unsubstituted and substituted quinacridones, 1,4-diketopyrrolopyrroles, copper phthalocyanine and perylene tetracarboxylic di-imide moieties and solid solutions containing at least two of the moieties.

16. The composition of claim 15, wherein Q is selected from the group consisting of unsubstituted and substituted quinacridones, 1,4-diketopyrrolopyrroles and solid solutions containing at least two of two of these moieties.

17. The composition of claim 12, wherein $R_1$, $R_2$ and $R_3$ are independently hydrogen, chlorine, methyl, ethyl, 2-chloroethyl, 2-methoxyethyl, benzyl, phenyl, naphthyl, p-chlorophenyl or p-methoxyphenyl.

18. The composition of claim 17, wherein $R_2$ is hydrogen, and $R_1$ and $R_3$ are methyl.

19. The composition of claim 12, wherein M is hydrogen, ammonium, trimethylcetylammonium or tributylbenzylammonium radicals, or sodium, potassium, magnesium, calcium, strontium, barium, aluminum or zinc metal cations.

20. The composition of claim 19, wherein M is hydrogen.

21. The composition of claim 12, wherein x is 0 to 0.2 and y is 0.1 to 1.0.

22. The composition of claim 11, which additionally contains from 0.05 to 20%, by weight, of a sulfonated polycyclic pigment.

23. The composition of claim 22, wherein said polycyclic pigment is selected from the group consisting of unsubstituted and substituted quinacridones, 1,4-diketopyrrolopyrroles, phthalocyanines, indanthrones, isoindolines, isoindolinones, flavanthrones, pyranthrones, anthraquinones, thioindigos, perylenes and dioxazines and solid solutions containing at least two of these moieties.

24. The composition of claim 23, wherein said polycyclic pigment is selected from the group consisting of unsubstituted and substituted quinacridones, 1,4-diketopyrrolopyrroles, copper phthalocyanine and perylene tetracarboxylic di-imide moieties and solid solutions containing at least two of two of these moieties.

25. The composition of claim 22, wherein said polycyclic pigment and the Q substituent of the pyrazole derivative are the same moiety.

26. A method of improving the rheological properties of a pigment dispersion, which comprises incorporating a pyrazole derivative of claim 1 into said pigment dispersion.

* * * * *